United States Patent
Aburakawa et al.

(10) Patent No.: US 7,072,586 B2
(45) Date of Patent: Jul. 4, 2006

(54) RADIO BASE STATION SYSTEM AND CENTRAL CONTROL STATION WITH UNIFIED TRANSMISSION FORMAT

(75) Inventors: Yuji Aburakawa, Yokohama (JP); Hirohito Suda, Yokosuka (JP); Yasushi Yamao, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 383 days.

(21) Appl. No.: 09/748,259

(22) Filed: Dec. 27, 2000

(65) Prior Publication Data
US 2002/0030870 A1 Mar. 14, 2002

(30) Foreign Application Priority Data
Dec. 28, 1999 (JP) ............................. 11-375803

(51) Int. Cl.
*H04B 10/00* (2006.01)

(52) U.S. Cl. ..................... 398/115; 398/116

(58) Field of Classification Search ........ 398/115–117, 398/118–131, 135–139, 167, 167.5
See application file for complete search history.

(56) References Cited

U.S. PATENT DOCUMENTS

| | | | |
|---|---|---|---|
| 4,701,904 A | * | 10/1987 | Darcie .......................... 398/72 |
| 5,339,184 A | * | 8/1994 | Tang ........................... 398/116 |
| 5,493,436 A | * | 2/1996 | Karasawa et al. .......... 398/116 |
| 5,648,961 A | | 7/1997 | Ebihara |
| 5,682,256 A | | 10/1997 | Motley et al. |
| 5,802,173 A | * | 9/1998 | Hamilton-Piercy et al. ......................... 379/56.2 |

(Continued)

FOREIGN PATENT DOCUMENTS

| | | |
|---|---|---|
| EP | 0 188 322 | 7/1986 |
| EP | 0 476 569 | 3/1992 |
| EP | 0 538 635 | 4/1993 |
| JP | 05-030044 | 2/1993 |
| JP | 07-236169 | 9/1995 |
| WO | WO 99/45728 | 9/1999 |

OTHER PUBLICATIONS

S. Komaki, et al., IEICE Transactions on Electronics, vol. E79-C, No. 1, pp. 98-104, XP-000580165, "Trends of Fiber-Optic Microcellular Radio Communication Networks", Jan. 1996.

(Continued)

*Primary Examiner*—Agusitn Bello
(74) *Attorney, Agent, or Firm*—Oblon, Spivak, McClelland, Maier & Neustadt, P.C.

(57) ABSTRACT

A central control station, which controls radio base stations connected thereto via radio links and optical fiber links, includes a demultiplexing unit which demultiplexes signals supplied from an upper-level station, signal conversion units which convert the respective demultiplexed signals into converted signals having a unified transmission format, and a distribution unit which distributes the converted signals to the radio links and the optical fiber links.

9 Claims, 11 Drawing Sheets

U.S. PATENT DOCUMENTS

| | | | |
|---|---|---|---|
| 5,870,392 A | | 2/1999 | Ann |
| 5,936,578 A | * | 8/1999 | Driessen et al. ............ 342/374 |
| 5,978,117 A | * | 11/1999 | Koonen ...................... 398/116 |
| 6,310,705 B1 | * | 10/2001 | Lee et al. ................... 398/126 |
| 6,314,163 B1 | * | 11/2001 | Acampora ................. 379/56.2 |
| 6,337,754 B1 | * | 1/2002 | Imajo ......................... 398/115 |
| 6,392,770 B1 | * | 5/2002 | Sasai et al. .................... 398/99 |
| 6,487,392 B1 | * | 11/2002 | Sonetaka ................... 455/11.1 |

OTHER PUBLICATIONS

A. Del Pistoia, et al., IEE, European Conference on Radio Relay Systems, vol. conf. 4, XP-000479318, pp. 84-89, "Technical and Economic Assessment on Radio Relay Systems in the Local and Distribution Italian Networks", Oct. 11, 1993.

* cited by examiner

RADIO BASE STATION SYSTEM AND CENTRAL CONTROL STATION WITH UNIFIED TRANSMISSION FORMAT

BACKGROUND OF THE INVENTION

1. Field of the Invention

The present invention generally relates to a radio base station system and a central control station as well as to a method of processing signals at the central control station

2. Description of the Related Art

Figure 10:
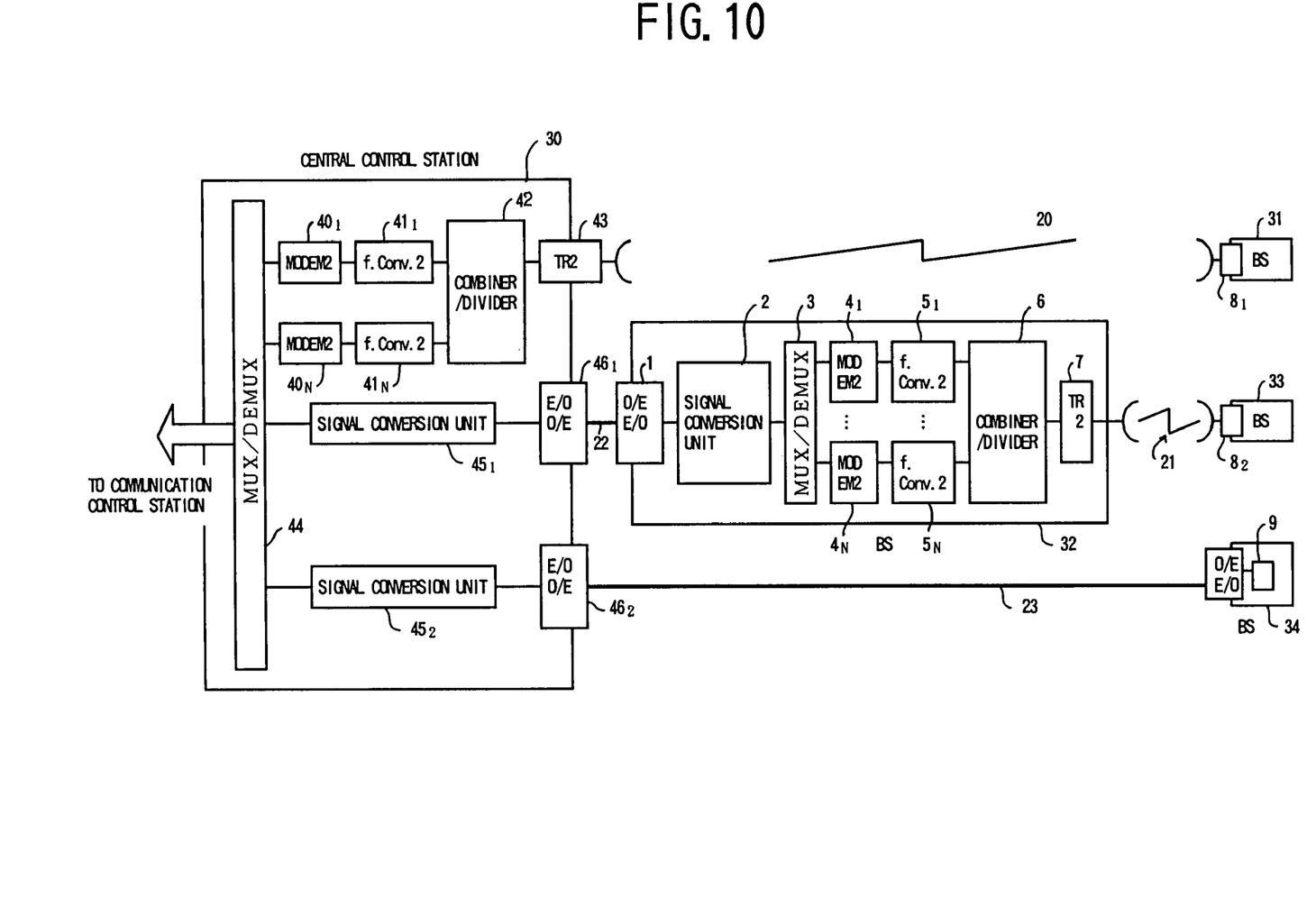
FIG. 10 is a block diagram showing a configuration of communication links between mobile-communication base stations.

FIG. 10 is a block diagram showing a configuration of communication links between mobile-communication base stations.

A central control station 30 (which may be a cluster central control station when base stations having a cluster structure are used) uses a radio communication link 20 and optical communication links 22 and 23 to establish communication links with radio base stations (BS) 31, 32, and 34, respectively. In the case of radio communication, the central control station 30 uses a multiplex/demultiplex equipment (MUX/DEMUX) 44 to supply signals to radio terminals as these signals are supplied from the communication control station. Base-band signals supplied to the terminals are modulated by modems (MODEM2) $40_1$ through $40_N$, and the resulting signals are converted into radio frequencies by frequency converters (f.Conv.2) $41_1$ through $41_N$. The output signals of the frequency converters (f.Conv.2) $41_1$ through $41_N$ are combined by a combiner/divider 42. A radio transceiver 43 transmits the combined signal to the radio base station 31.

Between the multiplex/demultiplex equipment 44 and the radio base station 31, modems and frequency converters are provided as many as a necessary maximum transmission capacity can be achieved.

In the case of the optical communication links 22 and 23, the central control station 30 uses the multiplex/demultiplex equipment 44 to supply the signals from the communication control station to terminals for optical communication. The base-band signals are converted by signal converters $45_1$ and $45_2$ into signals having a proper signal format for optical transmission in terms of timings and waveforms. The converted signals are further converted into optical signals by optical transceiver equipment (E/O, O/E) $46_1$ and $46_2$, followed by being transmitted to the base stations 32 and 34 via the optical fibers 22 and 23.

The radio base station 32 uses optical transceiver equipment (O/E, E/O) 1 to convert the signals received from the central control station 30 via the optical fiber 22 into electrical signals, and uses a signal converter 2 to further convert the signals into signals having a proper signal format for modems (MODEM2) $4_1$ through $4_N$. Multiplex/demultiplex equipment (MUX/DEMUX) 3 demultiplexes the signals, and the resultant signals are converted by the modems $4_1$ through $4_N$ and frequency converters (f.Conv.2) $5_1$ through $5_N$ into modulated signals having a radio frequency that is used between the radio base station (BS) 32 and a radio base station (BS) 33. A combiner/divider 6 combines the modulated signals, and a transceiver (TR2) 7 transmits the combined signal to the radio base station 33.

As in the case of radio communication, the optical communication link that is provided by the optical fiber 22 and extends to the radio base station 32 has a necessary maximum transmission capacity secured for the communication.

Figure 11A:
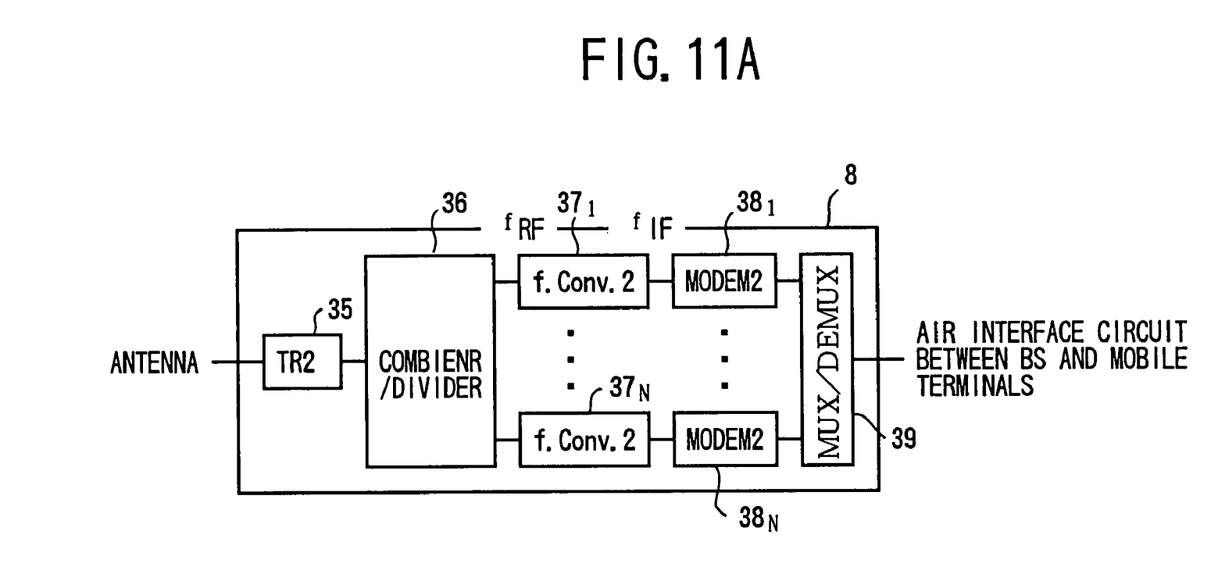
FIGS. 11A and 11B are block diagrams showing configurations of transceivers of radio base stations.
Figure 11B:
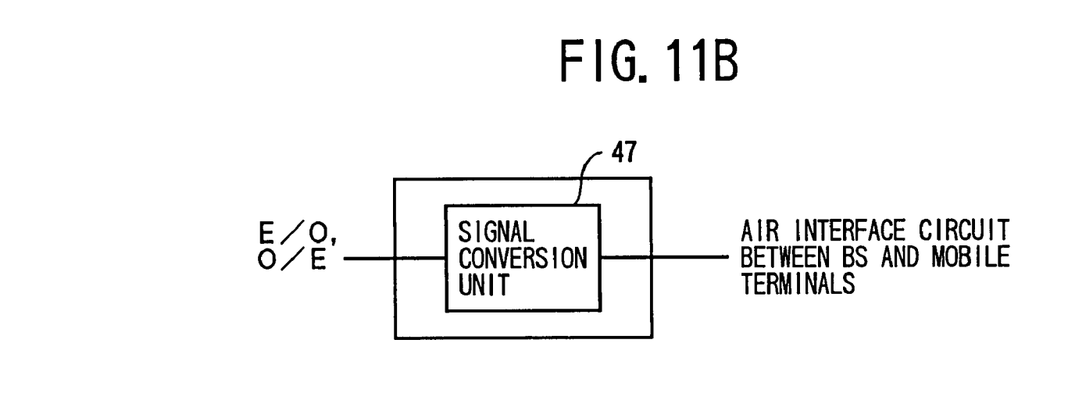

FIGS. 11A and 11B are block diagrams showing configurations of transceivers of the radio base stations.

FIG. 11A shows a transceiver of the radio base stations 31 and 33 that exchange radio communications.

A radio receiver/transceiver (TR2) 35 receives a radio signal via an antenna, and a combiner/divider 36 divides the received signal. The frequency converters (f.Conv.2) $37_1$ through $37_N$ convert the divided signals into signals having an intermediate frequency, and modems (MODEM2) $38_1$ through $38_N$ further convert the signals into base-band signals. The base-band signals are multiplexed by multiplex/demultiplex equipment (MUX/DEMUX) 39, which supplies an output signal thereof to a radio transmission circuit (air interface circuit) for transmission from the base station to mobile stations.

FIG. 11B shows a transceiver of the radio base station 34 connected to the central control station 30 through the optical fiber.

A digital signal, after conversion from an optical signal for the optical fiber into an electrical signal, is supplied to a signal converter 47, which convert the signal for optical-fiber digital transmission into a base-band signal for radio communication. The resultant signal is supplied to a radio transmission circuit (air interface circuit) for transmission from the base station 34 to mobile stations.

When communication links between the central control station and the radio base stations varies in their types as shown in the case of FIG. 10, shared use of equipment is difficult because of different transmission formats.

Further, the transmission capacity from the central control station to a radio base station needs to be secured to match a maximum required capacity. Because of this, modems and frequency converters must be provided as many as necessary for each communication link in the case of radio communication, and signal converters and base-band multiplexers need to be provided as many as necessary for each communication link in the case of optical-fiber communication. This may result in an excessive investment in facility.

Accordingly, there is a need for a radio base station system and a central control station which can harmonize transmission formats of radio communication links and optical-fiber communication links, and can gather all the signal converters to the central control station, thereby achieving high overall performance and efficient accommodation of communication lines.

SUMMARY OF THE INVENTION

It is a general object of the present invention to provide a radio base station system and a central control station that substantially obviate one or more of the problems caused by the limitations and disadvantages of the related art.

In order to achieve the above object according to the present invention, a central control station, which controls radio base stations connected thereto via radio links and optical fiber links, includes a demultiplexing unit which demultiplexes signals supplied from an upper-level station, signal conversion units which convert the respective demultiplexed signals into converted signals having a unified transmission format, and a distribution unit which distributes the converted signals to the radio links and the optical fiber links.

In this manner, the demultiplexing unit demultiplexes signals supplied from the upper-level station, and shared use of transceivers between radio communication and optical communication can be made by converting the demultiplexed signals into the signals having the unified transmission format. This achieves efficient use of hardware resources.

Further, the distribution unit distributes the signals having the unified transmission format, so that switching of communication links can be engaged by taking into account traffic conditions in accordance with indications of signal destinations. This makes it possible for different communication links to make shared use of the signal conversion units.

According to another aspect of the present invention, the central control station as described above is such that said signal conversion units are intermediate-frequency conversion units which convert the respective demultiplexed signals into intermediate frequency signals having an intermediate frequency, and said central control station further includes a radio frequency conversion unit which converts one of the intermediate frequency signals into a radio frequency signal having a radio frequency, a radio transmission unit which transmits the radio frequency signal to one of the radio base stations, and an optical signal transmission unit which transmits one of the intermediate frequency signals to one of the radio base stations after conversion thereof into an optical signal, whereby the signals from the upper-level station are transmitted by the radio transmission unit to the one of the radio base stations connected to the central control station via one of the radio links, and are transmitted by the optical signal transmission unit to the one of the radio base stations connected to the central control station via one of the optical fiber links.

In this manner, the optically transmitted signal has a format that is different from that of digital signals used in conventional cases, and is transmitted as modulated signals by using an intermediate frequency range used for radio communication. This makes it possible to share use of transceivers between radio communication and optical communication. Further, use of the distribution unit achieves efficient use of hardware resources.

According to another aspect of the present invention, the central control station as described above is such that said signal conversion units are radio-frequency conversion units which convert the respective demultiplexed signals into radio frequency signals having a radio frequency, and said central control station further includes an intermediate frequency conversion unit which converts one of the radio frequency signals into an intermediate frequency signal having an intermediate frequency, a radio transmission unit which transmits one of the radio frequency signals to one of the radio base stations, and an optical signal transmission unit which transmits the intermediate frequency signal or one of the radio frequency signals to one of the radio base stations after conversion thereof into an optical signal, whereby the signals from the upper-level station are transmitted by the radio transmission unit to the one of the radio base stations connected to the central control station via one of the radio links, and are transmitted by the optical signal transmission unit to the one of the radio base stations connected to the central control station via one of the optical fiber links.

In this manner, the signals are converted into the radio frequency signals, which are then transmitted to respective communication links. In this configuration, radio transceivers require only the function of signal amplification. When signals are to be transmitted through optical fibers, the signals are converted into a frequency range suitable for transmission. This provides greater latitude in designing of optical systems.

According to another aspect of the present invention, the central control station as described above is such that said signal conversion units are radio-frequency conversion units which convert the respective demultiplexed signals into radio frequency signals having a radio frequency, and said central control station further includes a radio transmission unit which transmits one of the radio frequency signals to one of the radio base stations, and an optical signal transmission unit which transmits one of the radio frequency signals to one of the radio base stations after conversion thereof into an optical signal, whereby the signals from the upper-level station are transmitted by the radio transmission unit to the one of the radio base stations connected to the central control station via one of the radio links, and are transmitted by the optical signal transmission unit to the one of the radio base stations connected to the central control station via one of the optical fiber links.

In this manner, the signals are converted into the radio frequency signals, which are then transmitted to respective communication links. In this configuration, radio transceivers require only the function of signal amplification. When signals are to be transmitted through optical fibers, the signals are transmitted or received as signals having a radio frequency range. This achieves a complete match between the signal transmission format of radio communication and that of optical communication. As a result, the central control station can arrange equipment therein without regard to transmission medium used for respective communication links.

According to another aspect of the present invention, the central control station described above is such that said signal conversion units are base-band modulation units which convert the respective demultiplexed signals into base-band signals, and said central control station further includes a digital-to-analog conversion unit which converts one of the base-band signals into an analog signal, a radio frequency conversion unit which converts the analog signal into a radio frequency signal having a radio frequency, a radio transmission unit which transmits the radio frequency signal to one of the radio base stations, an optical signal conversion unit which converts one of the base-band signals into a signal for optical fiber communication, and an optical signal transmission unit which converts the signal for optical fiber communication into an optical signal, and transmits the optical signal to one of the radio base stations, whereby the signals from the upper-level station are transmitted by the radio transmission unit to the one of the radio base stations connected to the central control station via one of the radio links, and are transmitted by the optical signal transmission unit to the one of the radio base stations connected to the central control station via one of the optical fiber links.

In this manner, when communication links between the central control station and the radio base stations are mostly optical fiber links, optical transmission is usually performed as digital transmission, thereby achieving an easier configuration of optical transmission systems. Further, since the base-band modulation units can be shared, efficient use thereof is achieved.

According to another aspect of the present invention, the central control station as described above is such that said signal conversion units are base-band modulation units which convert the respective demultiplexed signals into base-band signals, and said central control station further includes a digital-to-analog conversion unit which converts one of the base-band signals into an analog signal, a radio frequency conversion unit which converts the analog signal into a radio frequency signal having a radio frequency, an intermediate frequency conversion unit which converts one of the base-band signals into an intermediate frequency signal having an intermediate frequency, a radio transmission unit which transmits the radio frequency signal to one of the radio base stations, an optical signal conversion unit which converts one of the base-band signals into a signal for optical fiber communication, and an optical signal transmission unit which converts the intermediate frequency signal or the signal for optical fiber communication into an optical signal, and transmits the optical signal to one of the radio base stations, whereby the signals from the upper-level station are transmitted by the radio transmission unit to the one of the radio base stations connected to the central control station via one of the radio links, and are transmitted by the optical signal transmission unit to the one of the radio base stations connected to the central control station via one of the optical fiber links.

In this manner, the radio transceiver for relaying from one radio base station to another radio base station is implemented by the frequency conversion unit alone. This helps to simplify the device structure.

According to another aspect of the present invention, a method of processing signals in a control station which controls radio base stations connected thereto via radio links and optical fiber links includes the steps of demultiplexing signals supplied from an upper-level station, converting the demultiplexed signals into converted signals having a unified transmission format, and distributing the converted signals to the radio links and the optical fiber links.

In this manner, the steps of demultiplexing signals supplied from the upper-level station, converting the demultiplexed signals into converted signals having the unified transmission format, and distributing the converted signals to the radio links and the optical fiber links make it possible to share transceivers between radio communication and optical communication. Further, distribution of the signals of the unified transmission format achieves efficient use of hardware resources.

According to another aspect of the present invention, a radio-base-station system includes a plurality of radio base stations, and a central control station controlling said radio base stations and connected to some of said radio base stations directly via optical fibers, wherein one of said radio base stations includes a radio frequency conversion unit configured to convert an intermediate frequency signal into a radio frequency signal and a radio transmission unit configured to transmit the radio frequency signal to another one of said radio base stations, whereby said one of said radio base stations receives a signal having an intermediate frequency from the central control station, and transmits the signal received from the central control station to said another one of said radio base stations.

In this manner, a radio base station can transmit a signal to another radio base station by converting a signal received from the central control station to change from an intermediate frequency to a radio frequency, and this conversion is all that is necessary.

According to another aspect of the present invention, a radio-base-station system includes a plurality of radio base stations, and a central control station controlling said radio base stations and connected to some of said radio base stations directly via optical fibers, wherein one of said radio base stations includes a radio transmission unit configured to transmit a radio frequency signal to another one of said radio base stations, whereby said one of said radio base stations receives a signal having a radio frequency from the central control station, and transmits the signal received from the central control station to said another one of said radio base stations.

In this manner, a radio base station can transmit a signal to another radio base station by converting a signal received from the central control station to change from an intermediate frequency to a radio frequency, and this conversion is all that is necessary.

According to another aspect of the present invention, a radio-base-station system includes a plurality of radio base stations, and a central control station controlling said radio base stations and connected to some of said radio base stations directly via optical fibers, wherein one of said radio base stations includes a digital-to-analog conversion unit configured to convert a base-band signal into an analog signal, a radio frequency conversion unit configured to convert the analog signal into a radio frequency signal, and a radio transmission unit configured to transmit the radio frequency signal to another one of said radio base stations, whereby said one of said radio base stations receives a signal as a digital signal from the central control station, and transmits the signal received from the central control station to said another one of said radio base stations.

In this manner, a radio base station coverts a digital signal to a radio signal when the digital signal is received from the central control station, and can relay the radio signal to another radio base station.

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings.

Figure 1:
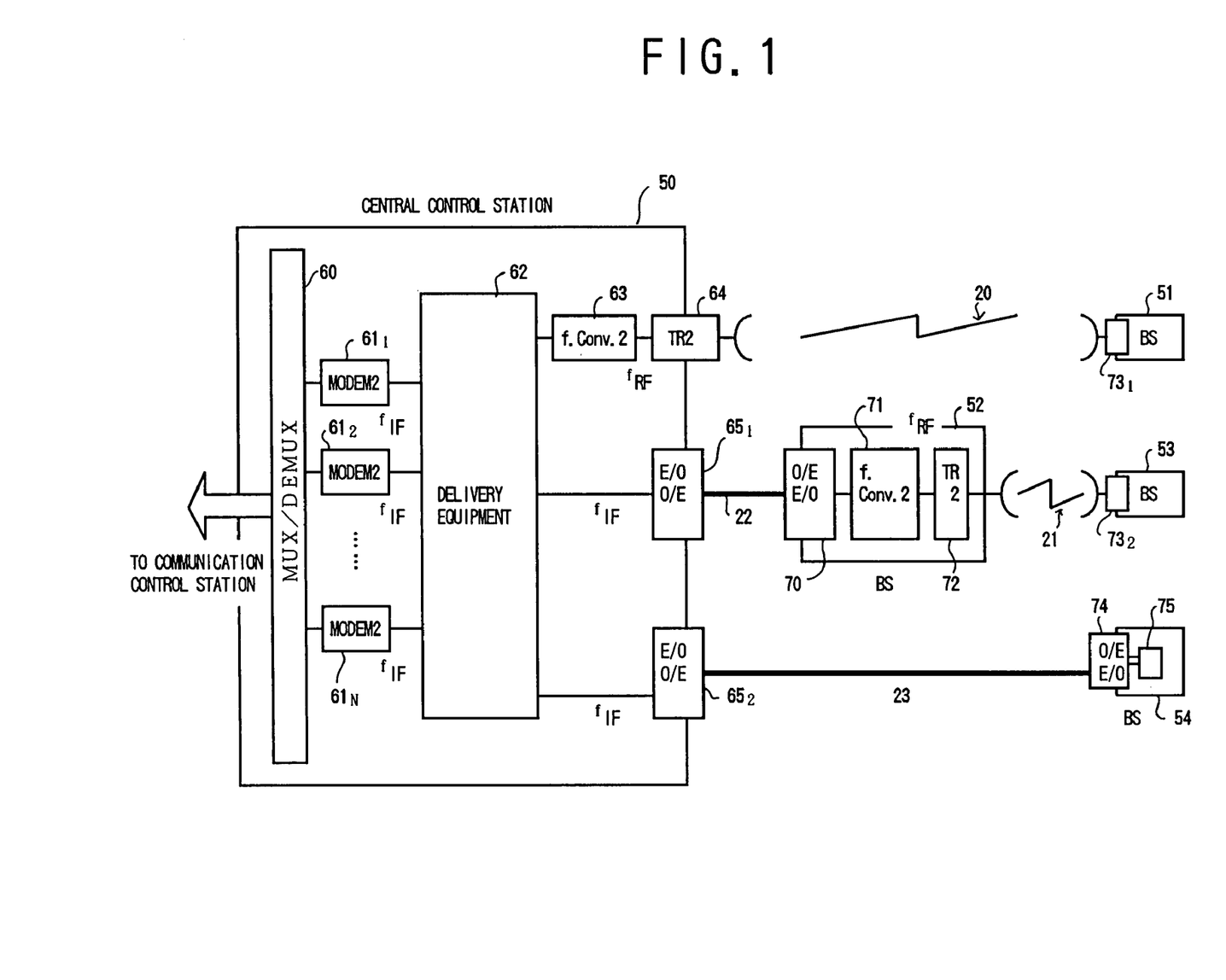
FIG. 1 is a block diagram showing a first embodiment of the present invention.

FIG. 1 is a block diagram showing a first embodiment of the present invention.

A central control station 50 (which may be a cluster central control station when base stations having a cluster structure are used) includes centrally located modems (MO- DEM2) $61_1$ through $61_N$ for communication between the central control station 50 and radio base stations 51, 52, and 54. Signals arriving from the communication control station are demultiplexed by multiplex/demultiplex equipment 60 to be supplied to the modems $61_1$ through $61_N$.

Upon receiving the signals, the modems $61_1$ through $61_N$ generate signals having intermediate frequency (IF). The IF signals output from the modems $61_1$ through $61_N$ are distributed by delivery equipment 62 to communication links. In respect of a radio communication link 20, a frequency converter (f.Conv.2) 63 converts the IF signals into signals (RF) having a radio frequency (RF), and a radio transceiver (TR2) 64 transmits the RF signals to the radio base station 51.

In respect of an optical-fiber communication link 23, the IF signals are converted into optical signals by optical transceiver equipment (E/O, O/E) $65_2$. The optical signals are then transmitted to the radio base station 54.

Receiving IF signals via an optical-fiber communication link 22, the radio base station 52 uses optical transceiver equipment (O/E, E/O) 70 to convert the received signals into electrical signals, which are then converted into RF signals by a frequency converter (f.Conv.2) 71. A radio transceiver (TR2) 72 transmits the RF signals to a radio base station (BS) 53. In this manner, the radio base station 52 serves to provide a relay function. This relay function is achieved by a simple configuration having the function of frequency conversion, and this is all that is necessary.

The delivery equipment 62 is equipped with a switching function, and switches destinations of transmissions with respect to the IF signals from the modems $61_1$ through $61_N$, depending on communication statuses such as traffic statuses Further, the delivery equipment 62 can connect all the signals from the modems $61_1$ through $61_N$ to a single destination, or can connect signals from a plurality of radio base stations to a single modem (MODEM2).

In the first embodiment, optically transmitted signals have a signal format that is not the format of ordinary digital signals, but are transmitted through an intermediate frequency band that is used for radio communication. This achieves shared use of transceivers between the radio communication and the optical communication. Further, use of the delivery equipment makes efficient use of the resources.

Figure 2:
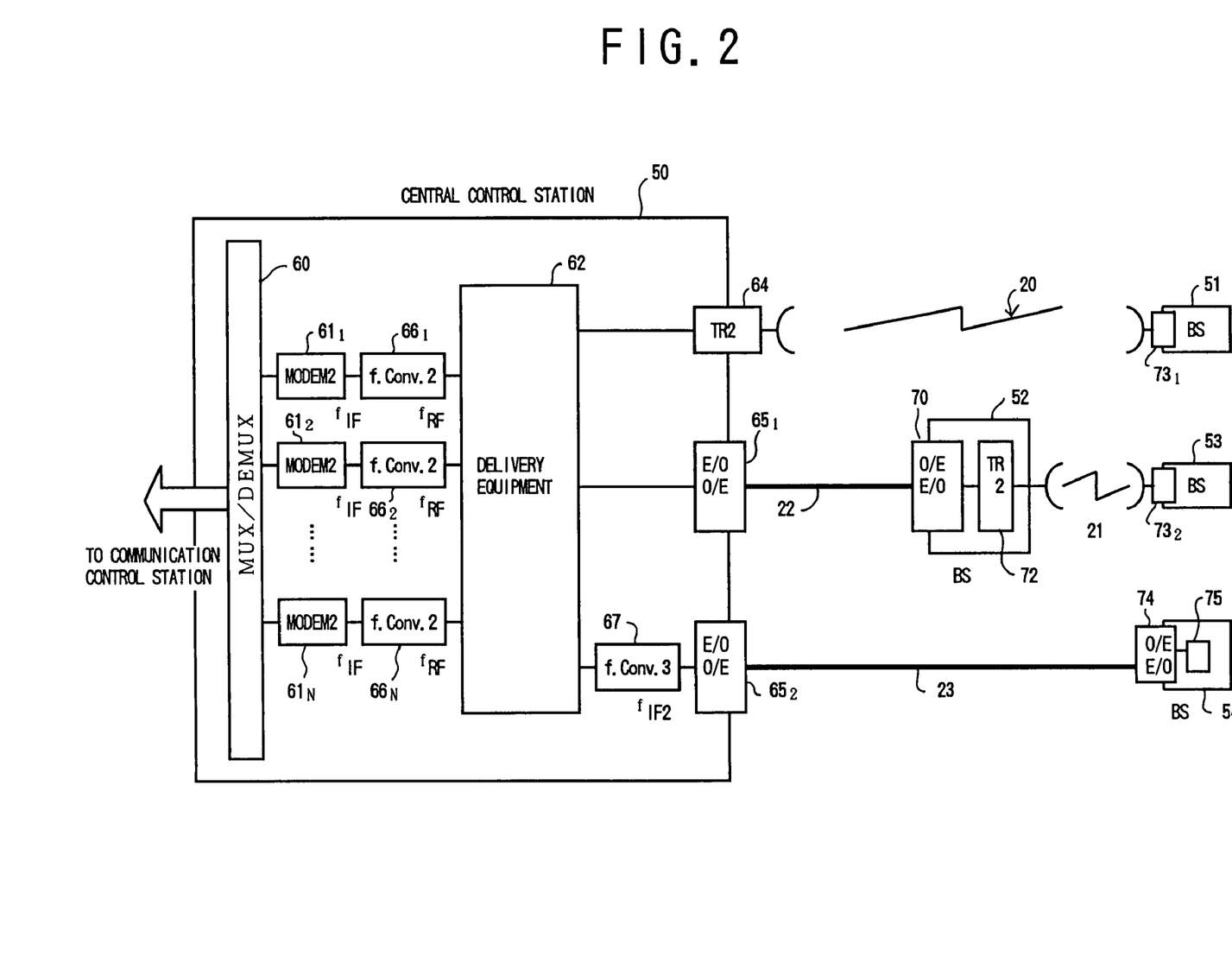
FIG. 2 is a block diagram showing a second embodiment of the present invention.

FIG. 2 is a block diagram showing a second embodiment of the present invention.

The central control station 50 includes the centrally located modems (MODEM2) $61_1$ through $61_N$ for communication between the central control station 50 and the radio base stations 51, 52, and 54. Signals arriving from the communication control station are demultiplexed by the multiplex/demultiplex equipment 60 to be supplied to the modems $61_1$ through $61_N$.

Upon receiving the signals, the modems $61_1$ through $61_N$ generate signals having intermediate frequency (IF). The IF signals are then converted into radio frequency signals by frequency converters (f.Conv.2) $66_1$ through $66_N$, and the RF signals are supplied to the radio transceiver (TR2) 64 via the delivery equipment 62. The radio transceiver 64 transmits the RF signals to the radio base station (BS) 51.

In respect of the optical-fiber communication link 23, the RF signals are converted by a frequency converter (f.Conv.3) 67 into signals having a frequency range (e.g., IF range) for optical-fiber transmission, and are further converted into optical signals by the optical transceiver equipment (E/O, O/E) $65_2$. The optical signals are then transmitted to the radio base station 54.

Receiving IF signals through optical-fiber communication, the radio base station (BS) 52 provided with the relay function uses the optical transceiver equipment (O/E, E/O) 70 to convert the received RF signals into electrical signals. The radio transceiver (TR2) 72 transmits these electrical signals to the radio base station (BS) 53 via the radio communication link 21. In this manner, the configuration of the equipment with the relay function can be significantly simplified.

In the same manner as in the first embodiment, the delivery equipment 62 is equipped with a switching function, and switches destinations of transmissions with respect to the IF signals from the modems $61_1$ through $61_N$, depending on communication statuses such as traffic statuses Further, the delivery equipment 62 can connect all the signals from the modems $61_1$ through $61_N$ to a single destination, or can connect signals from a plurality of radio base stations to a single modem (MODEM2).

In the second embodiment, distribution of signals is attended to in the radio frequency range, so that radio-communication transceivers can be implemented only by using the function of signal amplification. When signals are transmitted through optical-fiber communication links, these signals are converted into signals of a proper frequency range that is suitable for optical transmission. This increases latitude in designing optical transmission systems.

Figure 3:
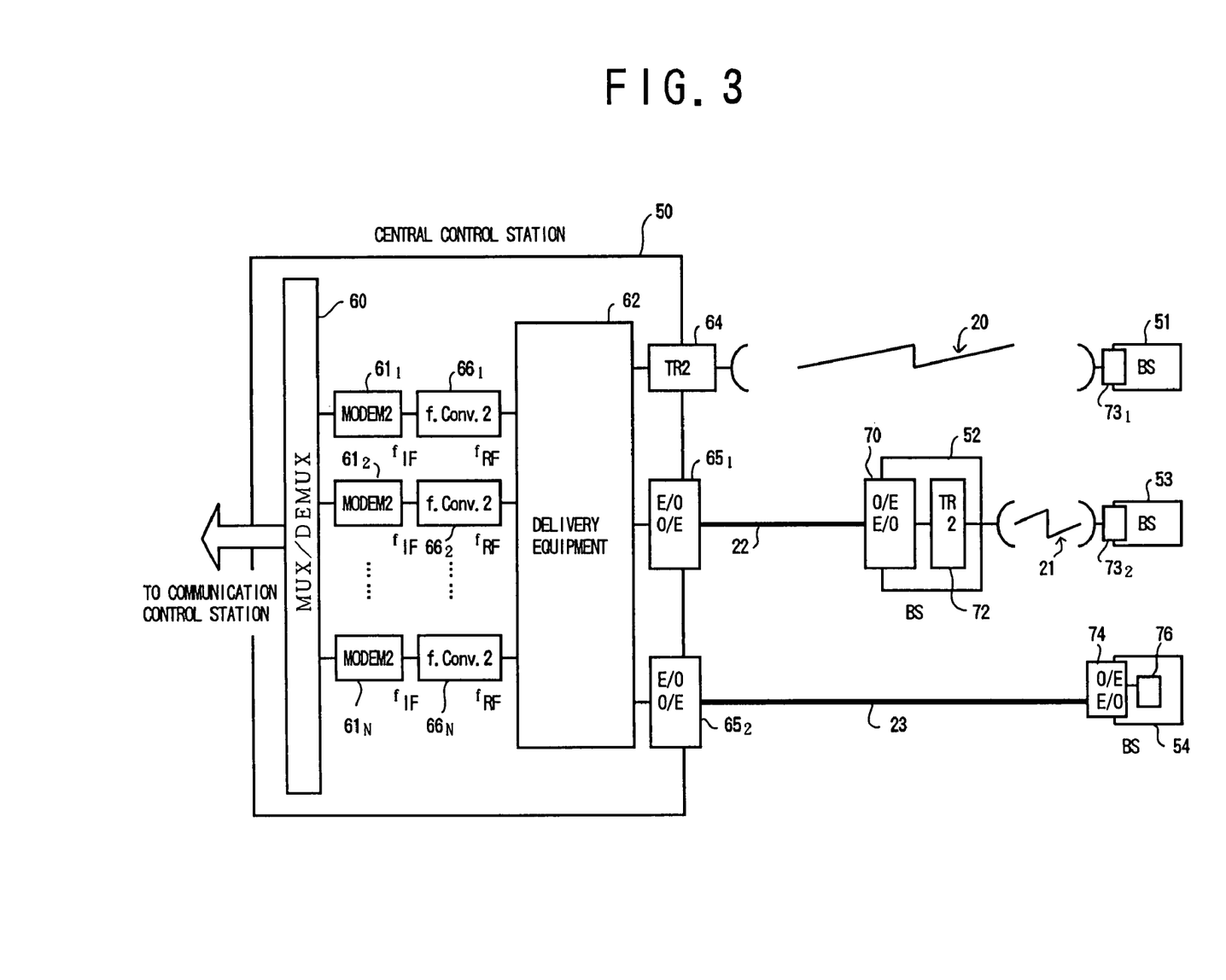
FIG. 3 is a block diagram showing a third embodiment of the present invention.

FIG. 3 is a block diagram showing a third embodiment of the present invention.

In the embodiment of FIG. 3, as far as the radio communication link 20 is concerned, the RF signals distributed by the delivery equipment 62 are transmitted by the radio transceiver (TR2) 64 to the radio base station (BS) 51 in the same manner as in the second embodiment.

In the case of the optical-fiber communication link 23, the optical transceiver equipment (E/O, O/E) $65_2$ converts the signals into optical signals while letting it maintain the radio frequency thereof, and transmits the optical signals to the radio base station (BS) 54.

Further, the radio base station (BS) 52, which is provided with the relay function, can use the radio transceiver (TR2) 72 to transmit the optically received signals to the radio base station (BS) 53 through radio while retaining the radio frequency of the signals.

In the third embodiment, the distribution of signals is attended to in the radio frequency range, so that the radio transceivers can be implemented only by using the function of signal amplification.

Even when signals are transmitted through optical-fiber communication links, these signals are allowed to retain the radio frequency range thereof. This guarantees a complete match of signal transmission formats between the radio communication and the optical communication. As a result, the central control station can use a device arrangement that is independent of transmission medium of the communication links.

Further, since the device arrangement used in the central control station is the same for any communication links between the central control station and the radio base stations, shared use of the equipment can be achieved to a higher degree, and universal applicability of the equipment is improved. Use of the delivery equipment 62 helps to make efficient use of the modems and the like.

Moreover, modems and the like can be allocated at any time depending on the traffic conditions or the like between central control stations and radio base stations. This helps to improve the efficiency of accommodation of communication links.

Figure 4A:
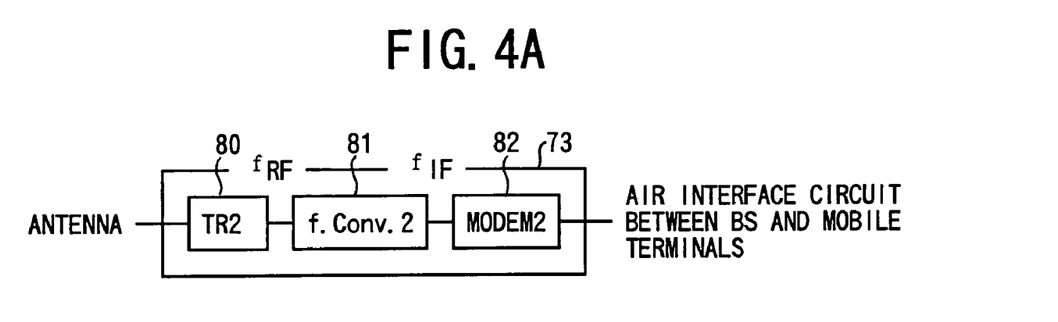
FIGS. 4A through 4C are block diagrams showing configurations of radio receivers provided in the radio base stations shown in FIG. 1 through FIG. 3.
Figure 4B:
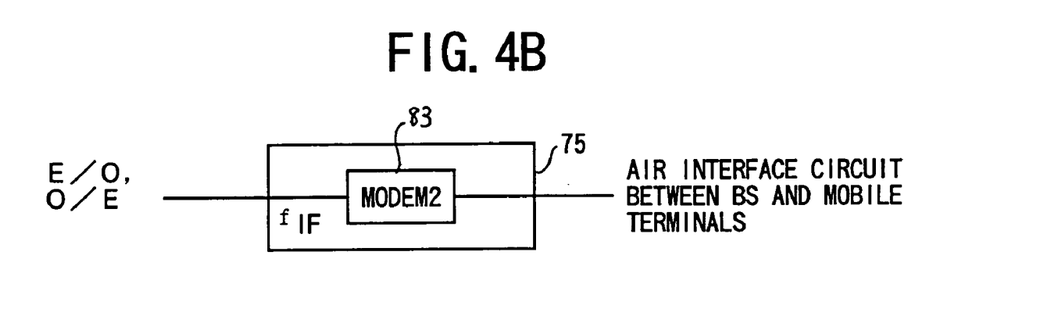
Figure 4C:
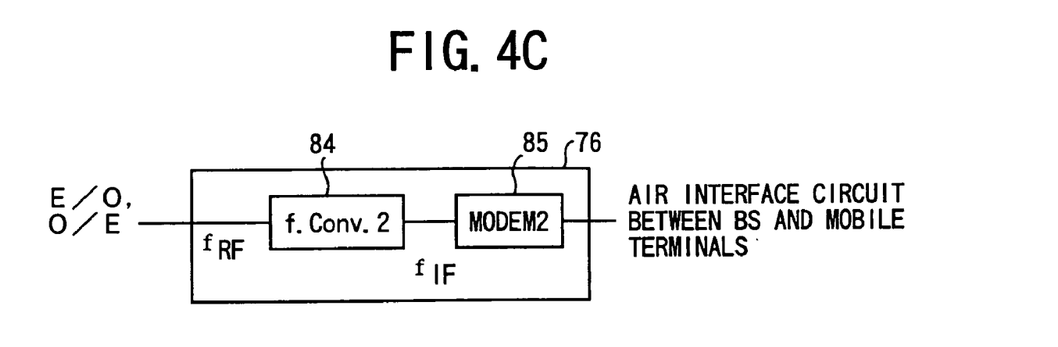

FIGS. 4A through 4C are block diagrams showing configurations of radio receivers provided in the radio base stations shown in FIG. 1 through FIG. 3.

FIG. 4A shows the radio base station connected through the radio communication link.

A radio receiver/transceiver (TR2) 80 receives a radio signal via an antenna, and a frequency converter (f.Conv.2) 81 converts the received signal into a signal having an intermediate frequency (IF). Modem (MODEM2) 82 then converts the IF signal into a base-band signal, which is supplied to a radio transmission circuit (air interface circuit) for transmission from the base station to mobile stations.

FIG. 4B shows a case in which an intermediate frequency signal is received by a radio base station connected to the central control station via an optical-fiber communication link.

After being converted into an electrical signal from an optically transmitted signal, the intermediate frequency signal is converted by a modem (MODEM2) 83 into a base-band signal, which is supplied to a radio transmission circuit (air interface circuit) for transmission from the base station to mobile stations.

FIG. 4C shows a case in which a radio frequency signal is received by a radio base station connected to the central control station via an optical-fiber communication link.

A radio frequency signal, after conversion from an optical signal of the optical fiber into an electrical signal, is supplied to a frequency converter (f.Conv.2) 84, which converts the signal into an intermediate frequency signal. The output of the frequency converter 84 is converted by a modem (MODEM2) 85 into a base-band signal, which is then supplied to a radio transmission circuit (air interface circuit) for transmission from the base station to mobile stations.

Figure 5:
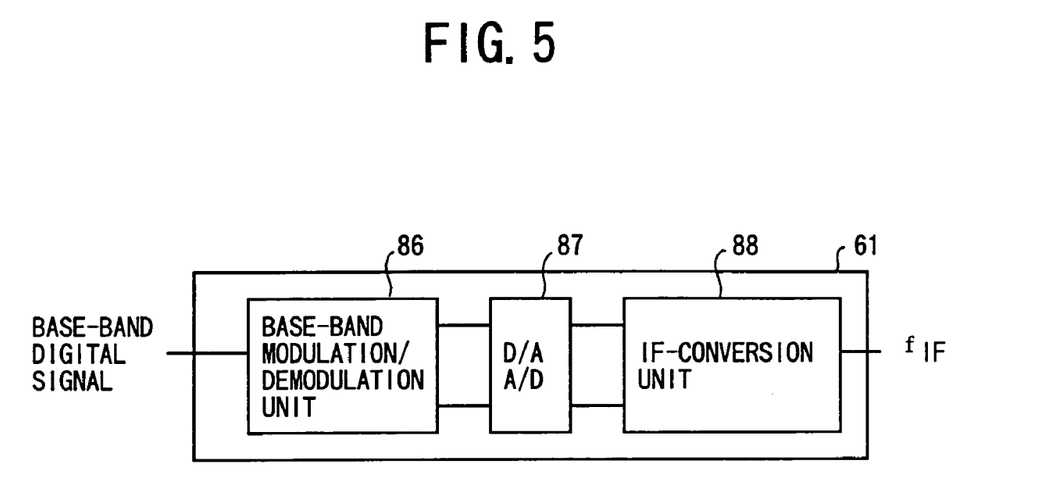
FIG. 5 is a block diagram of a modem.

FIG. 5 is a block diagram of a modem (MODEM2).

A base-band digital signal supplied to the modem is subjected to digital signal processing by a base-band modulation/demodulation unit 86. A D/A-and-A/D converter (D/A, A/D) 87 converts the output of the base-band modulation/demodulation unit 86 into an analog signal, which is converted into an IF signal by an IF conversion unit 88 before being output.

Figure 6:
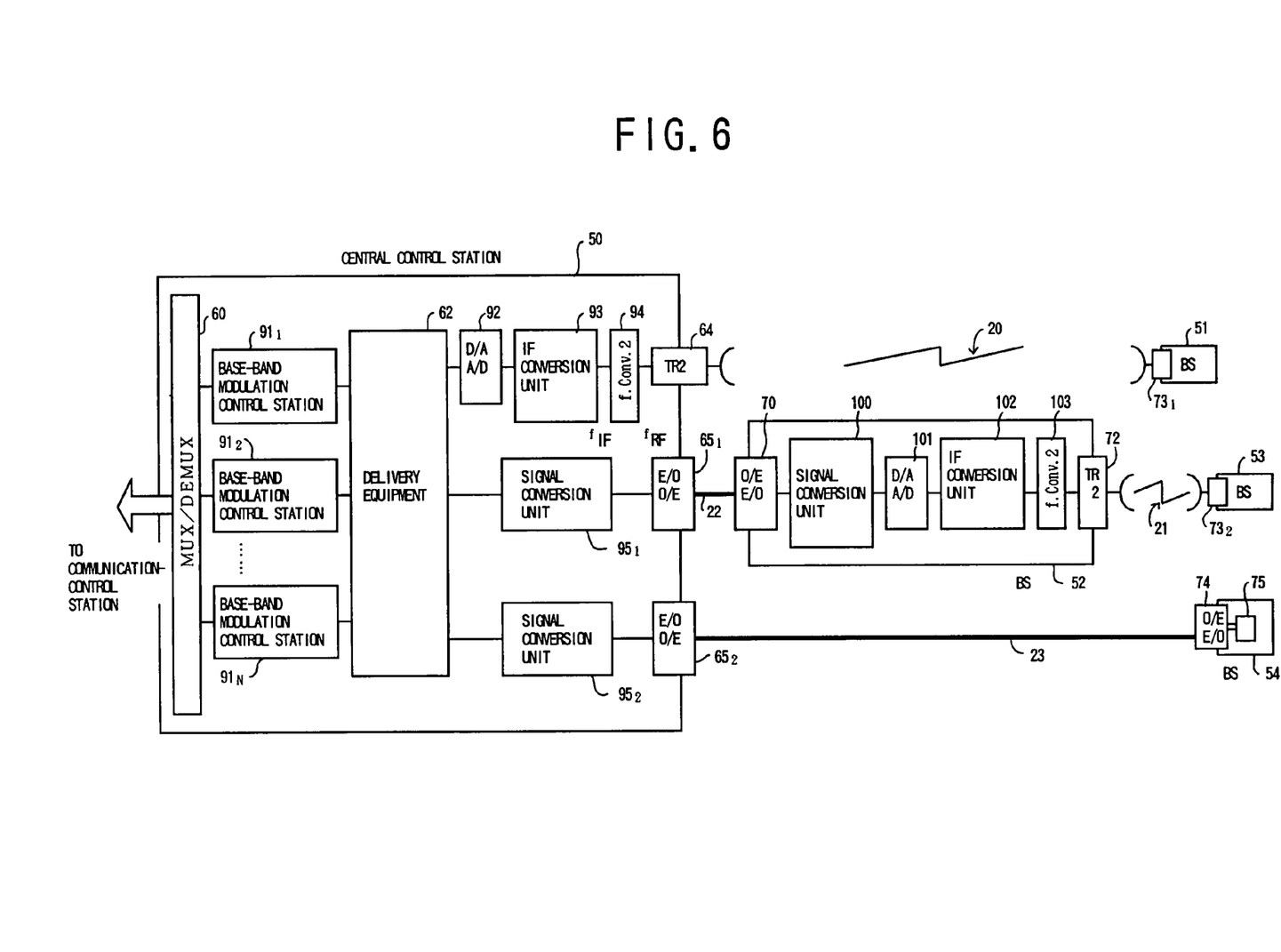
FIG. 6 is a block diagram showing a fourth embodiment of the present invention.

FIG. 6 is a block diagram showing a fourth embodiment of the present invention.

In this embodiment, the functions of the modem (MODEM2), which are used for communication between the central control station 50 and the radio base stations (BS), are broken down. The central control station 50 includes centrally located baseband modulation/demodulation units $91_1$ through $91_N$. Signals arriving from the communication control station are demultiplexed by the multiplex/demultiplex equipment (MUX/DEMUX) 60 to be supplied to the base-band modulation/demodulation units $91_1$ through $91_N$. Upon receiving the signals, the base-band modulation/demodulation units $91_1$ through $91_N$ attend to digital signal processing of modulation/demodulation. The processed signals output from the base-band modulation/demodulation units $91_1$ through $91_N$ are distributed by the delivery equipment 62 to communication links. In respect of the radio communication link 20, a D/A-and-A/D converter (D/A, A/D) 92 and an IF conversion unit 93 generate an intermediate frequency signal, which is converted into a radio frequency signal by a frequency converter (f.Conv.2) 94. The radio transceiver (TR2) 64 then transmits the RF signal to the radio base station (BS) 51.

In respect of the optical-fiber communication link 23, the digital signals from the delivery equipment 62 are converted by a signal converter $95_2$ into signals having a signal format for optical-fiber digital transmission. The optical transceiver equipment (E/O, O/E) $65_2$ converts the signals into optical signals, which are then transmitted to the radio base station (BS) 54.

The radio base station (BS) 52 is provided with the relay function to relay signals to the radio base station (BS) 53, and receives the digital signals transmitted through the optical fiber. The radio base station 52 uses the optical transceiver equipment (O/E, E/O) 70 to convert the received signals into electrical signals, which are then converted by a signal converter 100 into digital signals having the same format as the signals output from the base-band modulation/demodulation units. Then, a D/A-and-A/D converter (D/A, A/D) 101 and an IF conversion unit 102 generate intermediate frequency signals. The intermediate frequency signals are then converted into radio frequency signals by a frequency converter (f.Conv.2) 103, and the radio transceiver (TR2) 72 transmits the RF signals to the radio base station (BS) 53.

In the same manner as in the first through third embodiments, the delivery equipment 62 is equipped with a switching function, and switches destinations of transmissions with respect to the base-band signals from the base-band modulation/demodulation units $91_1$ through $91_N$, depending on communication statuses such as traffic statuses.

Figure 7:
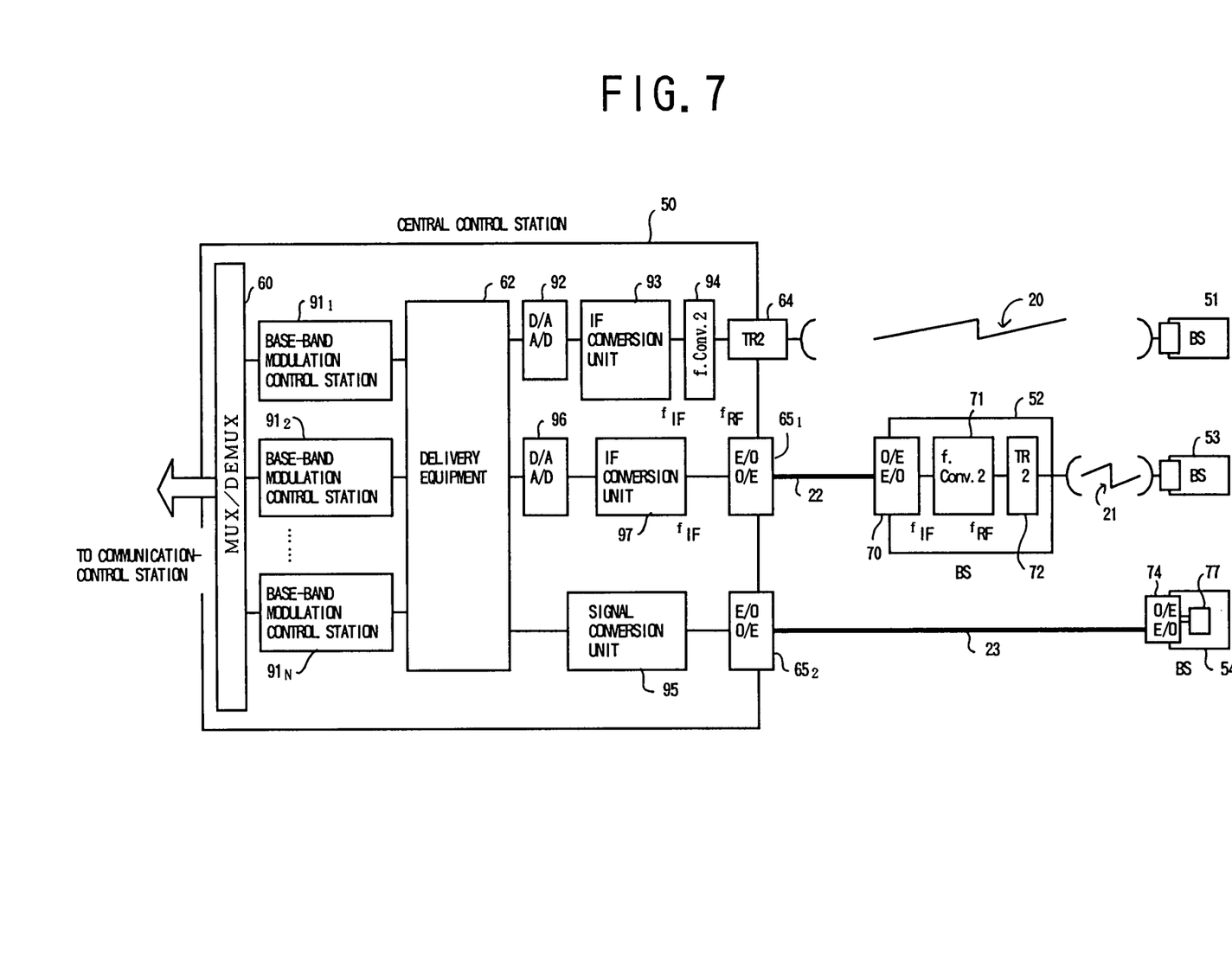
FIG. 7 is a block diagram showing a fifth embodiment of the present invention.

FIG. 7 is a block diagram showing a fifth embodiment of the present invention.

The fifth embodiment of FIG. 7 differs from the fourth embodiment of FIG. 6 in a configuration of the optical-fiber transmission for transmitting signals to the radio base station (BS) 52 that serves as a relay to the radio base station (BS) 53. That is, the base-band digital signals from the delivery equipment 62 are converted into analog signals by a D/A-and-A/D converter (D/A, A/D) 96, followed by conversion into intermediate frequency signals by an IF conversion unit 97. The IF signals are then converted by the optical transceiver equipment (E/O, O/E) $65_1$ into optical signals, which are transmitted through the optical fiber to the radio base station (BS) 52. The radio base station 52 uses the optical transceiver equipment (O/E, E/O) 70 to convert the received signals into electrical signals, which are then converted into RF signals by the frequency converter (f.Conv.2) 71. The radio transceiver (TR2) 72 transmits the RF signals through radio to the radio base station (BS) 53.

Figure 8:
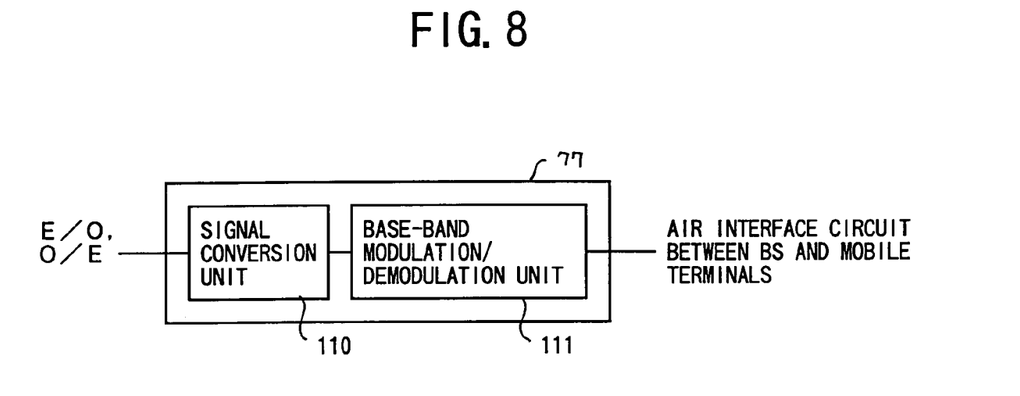
FIG. 8 is a block diagram of a transceiver of a radio base station connected to the central control station via an optical-fiber communication link in the fourth and fifth embodiments.

FIG. 8 is a block diagram of a transceiver of a radio base station connected to the central control station via an optical-fiber communication link in the fourth and fifth embodiments.

Digital signals supplied from the central control station through the optical fiber are converted by a signal converter 110 into signals having the same format as the signals output from the base-band modulation/demodulation units. After this, a base-band modulation/demodulation unit 111 attends to digital processing of signal demodulation so as to produce ordinary base-band signals. The base-band signals are then supplied to a radio transmission circuit (air interface circuit) for transmission from the base station to mobile stations.

In the above description, the description has been given with regard to flows of signals supplied from the communication control station. It should be noted that other flows of signals also exist from the radio base stations to the communication control station where the radio base stations exchange signals with mobile stations. Such flows of signals from the radio base stations to the communication control station can be implemented by applying processing that is reverse to the processing described above. For the sake of simplicity of explanation, a description of such processing has been omitted.

Figure 9:
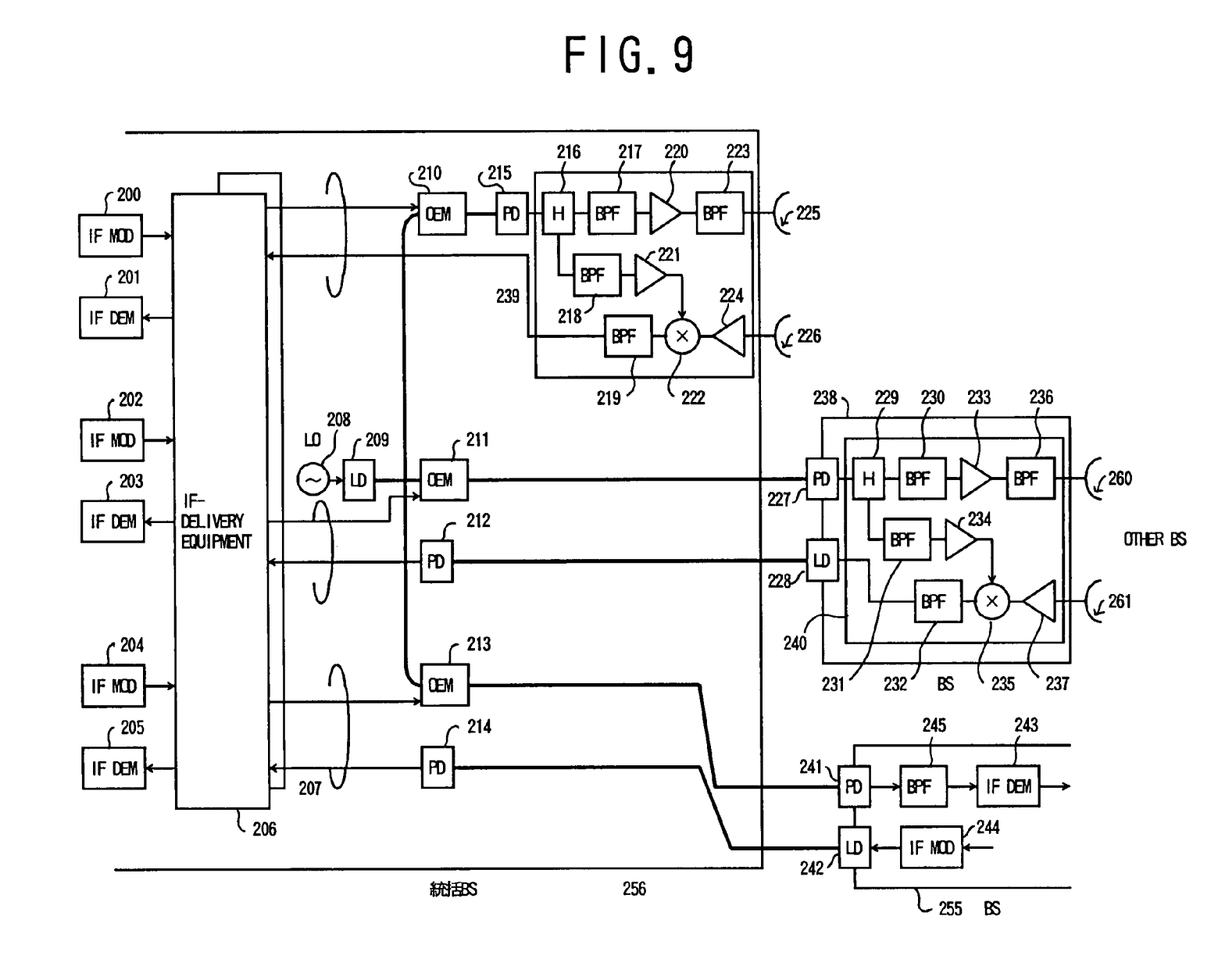
FIG. 9 is a block diagram showing a sixth embodiment of the present invention.

FIG. 9 is a block diagram showing a sixth embodiment of the present invention.

IF modulators 200, 202, and 204 receive signals from upper-level stations, and modulate them into intermediate frequency signals. A local oscillator circuit 208 generates a signal having a radio frequency $F_{LO}$. In response, a laser diode 209 generates an optical signal that is modulated by the radio frequency $F_{LO}$. The optical signal is further modulated by external optical modulators 210, 211, and 213 by using an intermediate frequency signal $F_{IF}$ supplied from an IF-delivery equipment 206. As a result, the optical signal outputs from the external optical modulators 210, 211, and 213 are modulated by the frequencies $F_{IF}$, $F_{LO}$, $F_{LO}+F_{IF}$, and $F_{LO}-F_{IF}$.

The optical signal from the external optical modulator 210 is converted by a photo detector 215 into an electrical signal ($F_{IF}$, $F_{LO}$, $F_{LO}+F_{IF}$, and $F_{LO}-F_{IF}$), which is then divided by a divider 216. One of the divided electrical signal is supplied to the BPF 217, which selects the frequency $F_{LO}+F_{IF}$. Here, a description is provided with reference to a case in which the frequency $F_{LO}+F_{IF}$ is used. Alternatively, the frequency $F_{LO}-F_{IF}$ may be used. The selected RF signal is transmitted through an amplifier 220, a BPF 223, and an antenna 225. Further, an antenna 226 receives a RF signal ($F_{LO}+F_{IF}$). This signal passes through an amplifier 224, a frequency converter 222, and a BPF 219, and is supplied as an intermediate frequency signal $F_{IF}$ to the upper-level station via an IF-delivery equipment 207.

A local oscillation frequency used by the frequency converter 222 is a signal having the frequency $F_{LO}$ that is extracted by the BPF 218 from an electrical signal ($F_{IF}$, $F_{LO}$, $F_{LO}+F_{IF}$, and $F_{LO}-F_{IF}$) where this electrical signal is one of the signals divided by the divider 216.

The external optical modulator 211 supplies an optical signal to a base station (BS) 238 via an optical fiber. The base station uses a photo detector 227, a divider 229, a BPF 230, an amplifier 233, and a BPF 236 to transmit the signal from an antenna 260. This achieves radio communication with other BSs.

An antenna 261 receives a RF signal, and the signal is transmitted to the upper-level station via an amplifier 237, a frequency converter 235, a BPF 232, a laser diode 228, a photo detector 212, and the IF-delivery equipment 207.

The external optical modulator 213 supplies an optical signal ($F_{IF}$, $F_{LO}$, $F_{LO}+F_{IF}$, and $F_{LO}-F_{IF}$) to a base station (BS) 255 via an optical fiber. The base station 255 uses a photo detector 241 to convert the received signal into an electrical signal ($F_{IF}$, $F_{LO}$, $F_{LO}+F_{IF}$, and $F_{LO}-F_{IF}$). A BPF 245 then extracts an intermediate frequency signal $F_{IF}$, which is demodulated by the IF demodulator 243.

A signal toward the upper station is modulated by an IF modulator 244 into an intermediate frequency signal, and is transmitted to the upper station via a laser diode 242, a photo detector 214, and an IF demodulator 205.

In this manner, the laser diode 209 and the local oscillation circuit 208 for downlinks are shared by different communication links, thereby simplifying the circuit structure.

Along the uplinks, the frequency converters 222 and 235 use local oscillation frequencies that are the frequency $F_{LO}$ detected by the downlink photo detectors 215 and 227 and extracted by the BPFs 218 and 231, respectively.

Further, in order to generate an optical signal having the frequency $F_{LO}$ by use of the laser diode 209 and the local oscillation circuit 208, a mode-lock laser or a broadband external modulator may be used.

In this embodiment, all that the laser diodes 228 and 242 need to do for the uplink is to perform the optical modulation of IF range signals. Inexpensive devices suffice for this purpose.

As described above, the present invention is directed to a mobile communication base station system, which includes radio base stations located in respective cells including a macro cell and a plurality of micro cells, and further includes a central control station for controlling the radio base stations. The central control station is provided with all the modems or the like that are needed for communication with the base stations and mobile terminals. That is, all the modems are gathered at the center location. This achieves use of the same signal format between radio communication and optical communication when communicating from the center control station to the radio base stations. Further, the outputs of the modems or the like are distributed properly by taking into account traffic conditions or the like, thereby providing flexible communication routes for communication with the center control center irrespective of the level of development of infrastructure in respect of the radio base stations.

Further, the present invention can make shared use of devices at the central control station between different communication links, thereby facilitating a size reduction, simplification, and easy designing of the radio base stations.

Further, delivery equipment having a switch function may be used for the purpose of making efficient use of the modems or the like. This makes it possible to provide a mobile communication system that offers high overall performance in terms of transmission capacity and the like.

Further, the present invention is not limited to these embodiments, but various variations and modifications may be made without departing from the scope of the present invention.

The present application is based on Japanese priority application No. 11-375803 filed on Dec. 28, 1999, with the Japanese Patent Office, the entire contents of which are hereby incorporated by reference.

What is claimed is:

1. A central control station configured to control base stations connected thereto, and is connected to an upper-level station, said central control station comprising:
 a demultiplexing unit configured to demultiplex a signal supplied from the upper-level station to generate a plurality of demultiplexed signals for transmission to the base stations;
 analog-to-digital converters coupled to said demultiplexing unit, configured to convert the respective demultiplexed signals from digital to analog, so as to output respective analog signals;
 analog signal conversion units which are coupled to said analog-to-digital converters, configured to convert the respective analog signals into converted analog signals having a common transmission format;
 transceiver units including at least one radio transceiver unit linked to a corresponding one of the base stations via a radio link and at least one optical transceiver unit linked to a corresponding one of the base stations via an optical fiber link; and
 a distribution unit which is provided between said analog signal conversion units and said transceiver units, configured to provide changeable interconnections between said analog signal conversion units and said transceiver units for the converted analog signals having the common transmission format, said common transmission format enabling compatibility between radio links and optical fiber links with respect to the changeable interconnections.

2. The central control station as claimed in claim 1, wherein said analog signal conversion units include a modulation/demodulation unit.

3. The central control station as claimed in claim 1, wherein said analog signal conversion units include a modulation/demodulation unit and a radio frequency conversion unit.

4. The central control station as claimed in claim 1, wherein said analog signal conversion units include a base-band modulation/demodulation unit.

5. A central control station which controls base stations connected thereto, and is connected to an upper-level station, said central control station comprising:

a demultiplexing unit configured to demultiplex a signal supplied from the upper-level station to generate a plurality of demultiplexed signals for transmission to the base stations;

digital-to-analog converters coupled to said multiplexing unit, configured to convert the respective demultiplexed signals from digital to analog, so as to output respective analog signals;

analog signal conversion means configured to convert the respective analog signals into converted analog signals having a common transmission format, said signal conversion means being coupled to said digital-to-analog converters;

transceiver units including at least one radio transceiver unit linked to a corresponding one of the base stations via a radio link and at least one optical transceiver unit linked to a corresponding one of the base stations via an optical fiber link; and a distribution unit which is provided between said analog signal conversion means and said transceiver units configured to provide changeable interconnections between said analog signal conversion means and said transceiver units for the converted analog signals having the common transmission format, said common transmission format enabling compatibility between radio links and optical fiber links with respect to the changeable interconnections.

6. The central control station as claimed in claim 5, wherein said analog signal conversion means includes a modulation/demodulation unit.

7. The central control station as claimed in claim 5, wherein said analog signal conversion means includes a modulation/demodulation unit and a radio frequency conversion unit.

8. The central control station as claimed in claim 5, wherein said analog signal conversion means includes a base-band modulation/demodulation unit.

9. A method for controlling base stations connected to an upper-level station in a mobile communication system, the method comprising:

demultiplexing a signal supplied from the upper-level station to generate a plurality of demultiplexed signals for transmission to the base stations;

first converting the respective demultiplexed signals from digital to analog to output respective analog signals, after said demultiplexing;

second converting the respective analog signals into converted analog signals having a common transmission format, after said first converting;

distributing said converted analog signals via changeable interconnections to transceiver units including at least one radio transceiver unit linked to a corresponding one of the base stations via a radio link and at least one optical transceiver unit linked to a corresponding one of the base stations via an optical fiber link, said common transmission format enabling compatibility between radio links and optical fiber links with respect to the changeable interconnections, after said second converting; and transmitting said distributed signals to the corresponding ones of the base stations via the radio link and the optical fiber link, after said distributing.

* * * * *